United States Patent [19]

Brattrud

[11] 4,131,269
[45] Dec. 26, 1978

[54] DEVICE FOR PROTECTION OF VEHICLE WINDOWS AGAINST ICE OR FROST

[76] Inventor: Hans Brattrud, 2870 Dokka, Norway

[21] Appl. No.: 762,342

[22] Filed: Jan. 25, 1977

[30] Foreign Application Priority Data

Jan. 27, 1976 [NO] Norway .................................. 760249

[51] Int. Cl.² ............................................... B60J 1/20
[52] U.S. Cl. ................................ 296/95 Q; 160/23 R; 219/203; 219/469; 296/141
[58] Field of Search .............. 296/95 R, 95 Q, 95 C, 296/140, 141, 136, 98; 135/5 A; 160/DIG. 3, 310, 23 R; 219/469, 470, 471, 203, 214, 244

[56] References Cited

U.S. PATENT DOCUMENTS

| | | |
|---|---|---|
| 1,999,171 | 4/1935 | Bryant .................................. 296/98 |
| 2,592,601 | 4/1952 | Raymond ........................... 296/95 R |
| 2,723,156 | 11/1955 | Stanziale .................................. 296/98 |
| 3,217,137 | 11/1965 | Weitzner .............................. 219/244 |
| 3,454,300 | 7/1969 | Pugsley ............................. 296/95 R |
| 3,601,580 | 8/1971 | Cannon ................................ 219/471 |

Primary Examiner—Joseph F. Peters, Jr.
Assistant Examiner—John A. Carroll
Attorney, Agent, or Firm—Stevens, Davis, Miller & Mosher

[57] ABSTRACT

A device for the protection of vehicle windows against frost and ice, comprising a housing mounted on the vehicle roof and containing a roller blind which may be pulled down from a slot in the housing to cover the window. The blind has at its lower end a soft reinforced border for sealing against the vehicle body.

8 Claims, 6 Drawing Figures

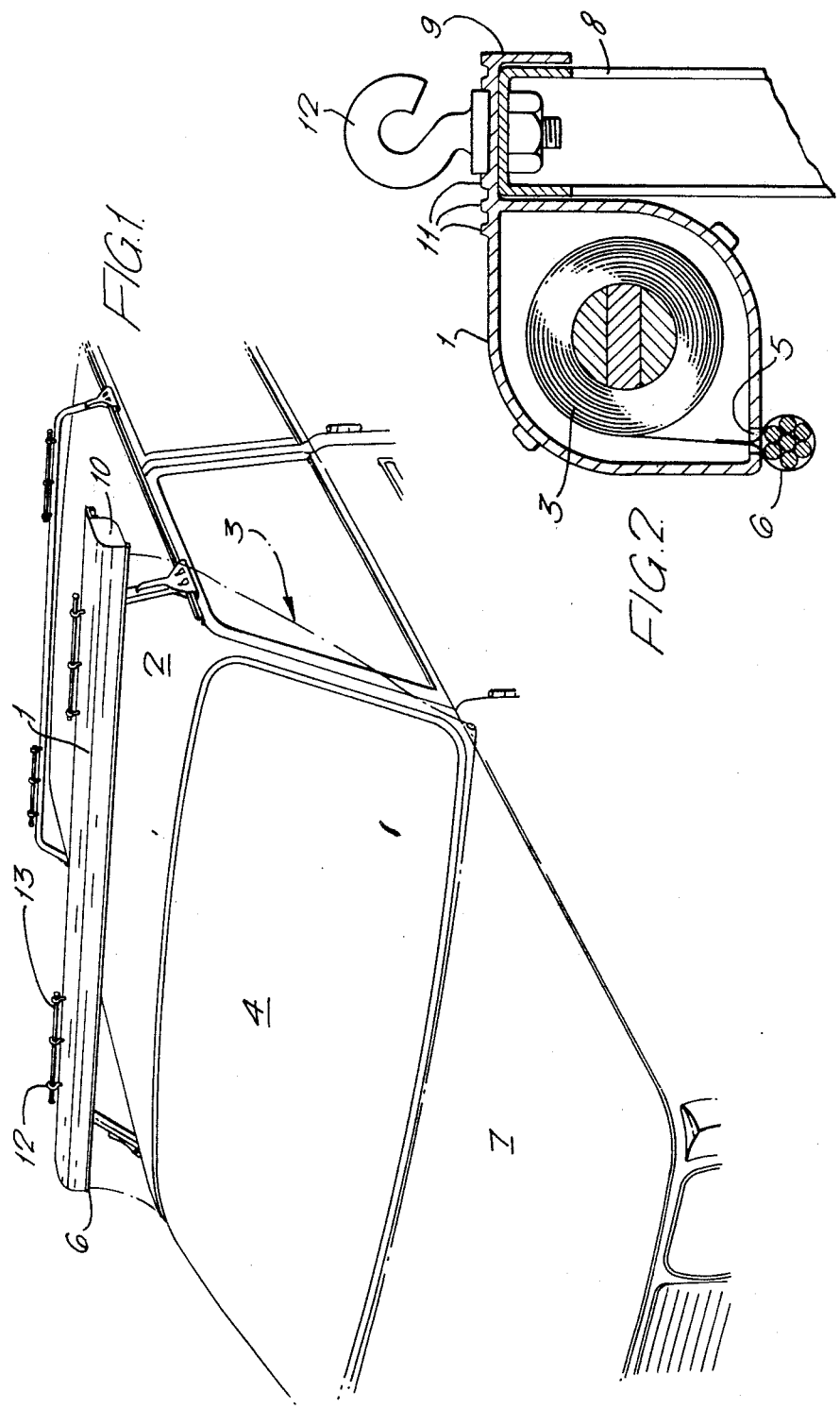

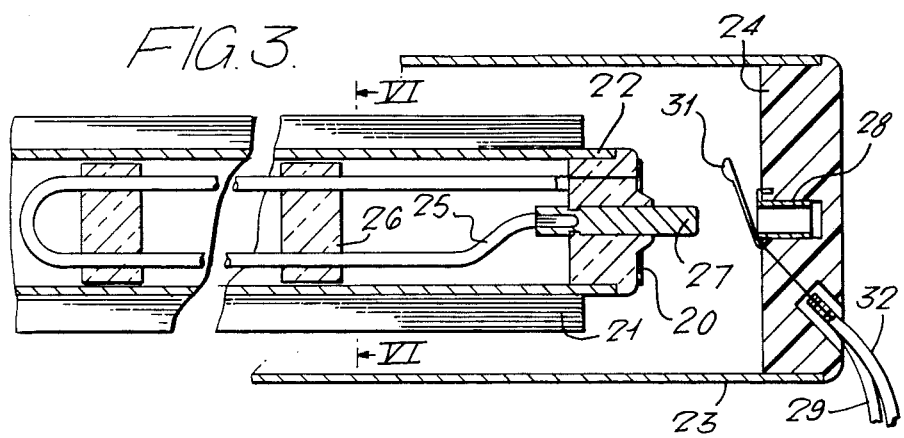
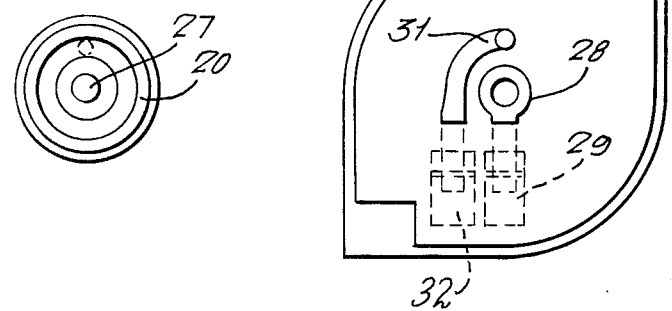
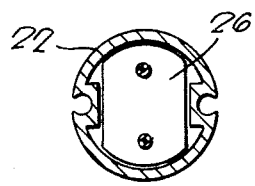

DEVICE FOR PROTECTION OF VEHICLE WINDOWS AGAINST ICE OR FROST

The present invention is related to a device for the protection of vehicle windows against ice and frost.

It is a well known disadvantage for the owners of cars and other vehicles having windows that in winter when such vehicles have been parked outdoors unprotected during temperature variations the window panes will be covered by frost, ice or snow, and a very hard covering may form which is time-consuming and requires rather hard work to remove before driving may take place.

It is thus a purpose of the present invention to eliminate said disadvantage, and this problem is according to the invention solved by the mounting of at least one housing on the vehicle roof, said housing containing a per se known roller blind which may be pulled down to cover the vehicle window. The blind is pulled from a slot arranged in the housing and which at its lower edge has a soft reinforced border for sealing against the car body or similar structure. According to another feature of the invention the housing comprises an extruded profile having attachment flanges adapted for ski-holders or car top carriers on the vehicle roof, and two end covers having a tight fit and being formed as roller blind supports. It is also a feature of the invention that the attachment flange of the housing on the top side is provided with ribs to support skis or other loads, as well as attachment holes providing possible adjustment of hooks for the strapping of skis. The edges of said slot in the housing are formed as scrapers for removing snow and ice from the blind during the retraction thereof to the inside the housing. The slot is tightly closed by means of the soft border of the blind when it is in its completely retracted condition.

It is also a purpose of the present invention to provide a device for the heating of the roller blind so that said blind will be freed from frost, snow or ice, and be dried so that it will be ready for use at any time. This problem is according to the invention solved by the provision inside the hollow core of the roller blind of a heating cable which is supplied with electric current from the vehicle battery through the shaft of the blind as supported in bearing in the stationary housing on the roof of the vehicle and through a sliding contact attached to said housing. The end surface of the blind core is provided with a corresponding slip ring.

The invention will be better understood from the following description of a preferred embodiment with reference to the drawings, wherein FIG. 1 shows the invention attached to a vehicle roof, FIG. 2 is a cross section on a larger scale of the invention, FIG. 3 is a portion of a longitudinal section of the invention with the movable and the stationary parts in an exploded view for better understanding, FIG. 4 is an end view of the movable part, FIG. 5 is an inside end view of the stationary part, and FIG. 6 is a section according to the line VI-VI in FIG. 3.

In the preferred embodiment shown in the drawing the housing 1 has been mounted on a car top carrier 8 at the front portion of the vehicle roof 2. The housing 1 is preferably made as an extruded profile having a suitable attachment flange 9 which is extruded integrally with the housing 1 and suitable for mounting on the car top carrier 8. The housing is made complete by means of two end covers 10 which are internally provided with support means (not shown) for the roller blind. The housing 1 furthermore has a slot 5 on its lower side, through which the roller blind may be pulled down to cover the window 4 of the vehicle. The lower edge 6 of the roller blind may be produced in a number of different ways, for instance by means of a rope, a cable or similar article which should be soft, so that the blind may in the best possible way adjust itself to conform to the vehicle body at the lower edge of the window 4. Said lower edge 6 of the blind may also be provided with magnets which are preferred to fix the lower edge 6 of the blind to the vehicle body 7. The same edge 6 serves in the retracted position of the blind as a sealing for the slot 5 so that the roller blind may be tightly protected in the housing 1.

The slot 5 is formed with edges which during winding of the blind will serve as scrapers for removal of snow and ice from the blind 3.

The mounting flange 9 has a form which is per se not critical for the use of the invention. It is only important that the flange should be formed and adapted to an ordinary car top carrier 8. The flange 9 may on the upper surface be provided with ribs 11 for better support of loads, for instance, skis, and the mounting flange should have oblong attachment holes for hook screws 12 to be used for ski straps 13 in addition to the adjustment and attachment of the housing 1.

As will be particularly obvious from FIG. 1 it is important that the housing 1 has sufficient length so that the blind 3 will cover all of the window 4 which in many cases is broader at the lower portion than at the upper portion. The blind 3 in FIG. 1 is shown in its pulled position by means of broken lines.

Although the illustrated embodiment only comprises one single blind for the windshield of a car, it is within the scope of the invention to use similar housings and blinds on several sides of a vehicle and preferably assembled to provide a luggage support or a similar structure on the vehicle roof. Thus the invention is not limited to the illustrated embodiment on a car with only one housing and one blind.

It is also within the scope of the invention to provide one or more blinds on a vehicle having camouflage pattern for use on military vehicles.

The longitudinal section shown in FIG. 3 is a blind 21 retracted on a hollow core 22 which is rotatably mounted in a stationary housing 23 provided with bearings in the end covers 24 of the housing (only one is shown in FIG. 3).

Inside the hollow core 22 there has been arranged according to the invention an electric heating cable 25 in the form of a loop and supported by insulating supporting blocks 26 in a number suitable for the purpose. The heating cable 25 is supplied with electric current from the vehicle battery through two contacts of which one is formed by the shaft 27 which is rotating in a bearing 28 (see also FIG. 5) which is supplied with current through a cable 29. The other end of the heating cable loop 25 terminates in a slip ring 20 mounted in the end surface of the blind core on the corresponding insulated support 26 (see also FIG. 4). A sliding contact 31 is connected to the second terminal of the vehicle battery by means of a cable 32 and slides on the slip ring 20 thus closing the electric circuit to the heating cable when a switch, (not shown) positioned in a suitable place inside the vehicle, is closed.

It is in this connection advantageous to provide the housing 23 with ventilation openings on suitable protected places for aerating the moisture.

It is also within the scope of this invention as an alternative to give the blind itself a surface covering, for instance, consisting of an electrically conducting paint to be used for heating and drying of the blind in its retracted condition.

I claim:

1. A device for the protection of vehicle windows against frost and ice comprising:
    (a) an elongated integral housing for attachment to a car top carrier, said housing having an outwardly projecting integral flange, two end covers, and a longitudinally extending slot, said flange having means for attachment thereon to said car top carrier;
    (b) a roller blind rotatably mounted in said housing, which may be pulled out to cover at least one window of a vehicle on which it is mounted;
    (c) a soft reinforced border on the outer end of said roller blind for sealing against the vehicle body.

2. The device of claim 1 in which the flange has an upper surface with ribs projecting therefrom for support of loads thereon.

3. The device of claim 2 having means for attaching carrying straps to said flange.

4. The device of claim 1 in which the slot is shaped to scrape snow and ice from the roller blind when being retracted and to be tightly closed by said soft reinforced border when completely retracted.

5. The device of claim 1 including electric heating means within said housing for melting snow and ice.

6. The device of claim 5 in which the electric heating means is within a hollow core of the roller blind, the roller for said blind having a slip ring and sliding contact for supplying electricity thereto.

7. A device for the protection of vehicle windows against frost and ice comprising an elongated housing having a roller blind mounted therein to be pulled out to cover at least one window of a vehicle on which it is mounted; an electric heating means within a hollow core of the roller blind for melting snow and ice.

8. The device of claim 7 in which the roller for said blind has a slip ring and sliding contact for supplying electricity thereto.

* * * * *